US012593309B2

(12) United States Patent
Ma et al.

(10) Patent No.: US 12,593,309 B2
(45) Date of Patent: Mar. 31, 2026

(54) METHOD, DEVICE AND COMPUTER PROGRAM PRODUCT FOR USING PAGING EARLY INDICATIONS FOR PAGING OCCASIONS IN WIRELESS COMMUNICATION

(71) Applicant: ZTE Corporation, Shenzhen (CN)

(72) Inventors: Xuan Ma, Shenzhen (CN); Mengzhu Chen, Shenzhen (CN); Jun Xu, Shenzhen (CN); Focai Peng, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 295 days.

(21) Appl. No.: 18/510,838

(22) Filed: Nov. 16, 2023

(65) Prior Publication Data

US 2024/0098696 A1 Mar. 21, 2024

Related U.S. Application Data

(63) Continuation of application No. PCT/CN2021/111273, filed on Aug. 6, 2021.

(51) Int. Cl.
*H04W 68/02* (2009.01)
*H04W 56/00* (2009.01)
*H04W 68/00* (2009.01)

(52) U.S. Cl.
CPC ....... *H04W 68/02* (2013.01); *H04W 56/0015* (2013.01); *H04W 68/005* (2013.01)

(58) Field of Classification Search
CPC ............. H04W 68/02; H04W 56/0015; H04W 68/005

USPC .......................................................... 455/458
See application file for complete search history.

(56) References Cited

U.S. PATENT DOCUMENTS

| | | | | |
|---|---|---|---|---|
| 2020/0236646 A1* | 7/2020 | Liu | ........................ | H04W 16/28 |
| 2022/0046585 A1* | 2/2022 | Wu | ........................ | H04L 5/0094 |
| 2022/0070783 A1* | 3/2022 | Hsieh | ................ | H04W 52/0235 |
| 2022/0312369 A1* | 9/2022 | He | ........................ | H04W 68/02 |

(Continued)

FOREIGN PATENT DOCUMENTS

| | | |
|---|---|---|
| CN | 110999459 A | 4/2020 |
| CN | 112544114 A | 3/2021 |

(Continued)

OTHER PUBLICATIONS

International Search Report and Written Opinion regarding PCT/CN2021/111273 dated Mar. 28, 2022,.

(Continued)

*Primary Examiner* — Mark G. Pannell
(74) *Attorney, Agent, or Firm* — Crowell & Moring LLP

(57) ABSTRACT

Method, device and computer program product for wireless communication are provided. A method includes receiving, by a wireless communication terminal from a wireless communication node, one or more paging early indications, PEIs. The wireless communication node indicates whether to detect paging information in one of paging occasions, POs, according to an indicator in at least one PEI of the PEIs and a paging indication in a PEI among the PEIs, or according to the paging indication in the PEI and a relationship between the PEIs and the POs.

20 Claims, 12 Drawing Sheets

(56)                    References Cited

U.S. PATENT DOCUMENTS

| 2023/0108646 A1* | 4/2023 | Tseng .................. H04W 68/025 |
| | | 455/458 |
| 2023/0146553 A1* | 5/2023 | Liao ...................... H04W 68/02 |
| | | 370/329 |
| 2024/0064700 A1* | 2/2024 | Zhang ............... H04W 52/0216 |

FOREIGN PATENT DOCUMENTS

| CN | 113170282 A | 7/2021 |
| WO | WO 2020216242 A1 | 10/2020 |

OTHER PUBLICATIONS

Mediatek Inc., "On Paging Enhancements for Idle/Inactive Mode UE Power Saving," *3GPP TSG RAN WGJ #105-e R1-2105386,* May 12, 12, 2021.

* cited by examiner receiving, by a wireless communication terminal from a wireless communication node, one or more PEIs, wherein the wireless communication node indicates whether to detect paging information in one of POs according to an indicator in at least one PEI of the PEIs and a paging indication in a PEI among the PEIs, or according to the paging indication in the PEI and a relationship between the PEIs and the POs.

FIG. 11 transmitting, by a wireless communication node to a wireless communication terminal, one or more PEIs to indicate the wireless communication terminal to detect paging information in one of POs or not according to an indicator in at least one PEI of the PEIs and a paging indication in a PEI among the PEIs, or according to the paging indication in a PEI and a relationship between the PEIs and the POs

FIG. 12

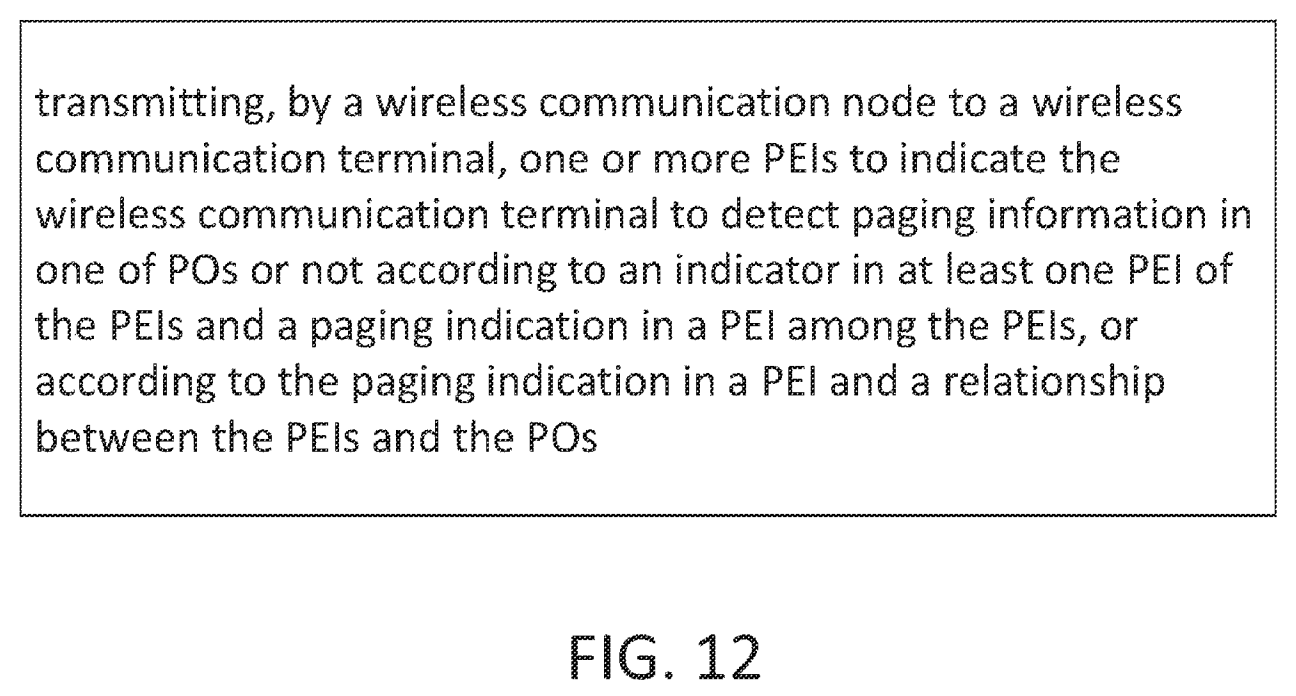

METHOD, DEVICE AND COMPUTER PROGRAM PRODUCT FOR USING PAGING EARLY INDICATIONS FOR PAGING OCCASIONS IN WIRELESS COMMUNICATION

CROSS-REFERENCE TO RELATED APPLICATION

This application is a continuation application of PCT International Patent Application No. PCT/CN2021/111273, filed with the China National Intellectual Property Administration, PRC on Aug. 6, 2021, which is herein incorporated by reference in its entirety.

TECHNICAL FIELD

This document is directed generally to wireless communications.

BACKGROUND

According to the current 3GPP (3$^{rd}$ Generation Partnership Project) protocol, a UE (user equipment) monitors a PO (paging occasion) in each DRX (discontinuous reception) cycle (i.e., paging cycle) in the RRC_IDLE state or the RRC_INACTIVE state. However, the UE may not have paging messages (or paging information) in all paging cycles. For the UEs with low paging probability, if the UE receives a large number of unnecessary paging messages, it may cause high power consumption.

A signal or channel can be transmitted before the PO to indicate whether the UE needs to receive the paging messages. It can reduce the power consumption caused by paging detection. However, if the signal or channel is improperly designed or configured, the power consumption of the UE may not be reduced.

The present disclosure relates to methods, devices, and computer program products for reducing power consumption.

SUMMARY

One aspect of the present disclosure relates to a wireless communication method. In an embodiment, the wireless communication method includes receiving, by a wireless communication terminal from a wireless communication node, one or more paging early indications, PEIs. The wireless communication node indicates whether to detect paging information in one of paging occasions, POs, according to an indicator in at least one PEI of the PEIs and a paging indication in a PEI among the PEIs, or according to the paging indication in the PEI and a relationship between the PEIs and the POs.

Another aspect of the present disclosure relates to a wireless communication method. In an embodiment, the wireless communication method includes transmitting, by a wireless communication node to a wireless communication terminal, one or more paging early indications, PEIs, to indicate the wireless communication terminal to detect paging information in one of paging occasions, POs, or not according to an indicator in at least one PEI of the PEIs and a paging indication in a PEI among the PEIs, or according to the paging indication in a PEI and a relationship between the PEIs and the POs.

Another aspect of the present disclosure relates to a wireless communication terminal. In an embodiment, the wireless communication terminal includes a communication unit and a processor. The processor is configured to receive, from a wireless communication node, one or more paging early indications, PEIs. The wireless communication node indicates whether to detect paging information in one of paging occasions, POs, according to an indicator in at least one PEI of the PEIs and a paging indication in a PEI among the PEIs, or according to the paging indication in the PEI and a relationship between the PEIs and the POs.

Another aspect of the present disclosure relates to a wireless communication node. In an embodiment, the wireless communication node includes a communication unit and a processor. The processor is configured to transmit, to a wireless communication terminal, one or more paging early indications, PEIs, to indicate the wireless communication terminal to detect paging information in one of paging occasions, POs, or not according to an indicator in at least one PEI of the PEIs and a paging indication in a PEI among the PEIs, or according to the paging indication in a PEI and a relationship between the PEIs and the POs.

Various embodiments may preferably implement the following features.

Preferably, one PEI includes one PEI occasion, or one PEI includes one PEI burst including multiple PEI occasions.

Preferably, the wireless communication terminal detects the at least one PEI of the PEIs in a PEI window.

Preferably, a number of the PEIs in the PEI window is determined by at least one of: a number of POs between two Synchronization Signal/PBCH Blocks, SSBs; one or more higher layer parameters; information transmitted by a System Information Block, SIB; a number of POs in a paging frame, PF; a number of POs between two PEI windows; a number of POs corresponding to one PEI window; a number of PFs corresponding to one PEI window; or a number of PFs between two PEI windows; or the number of the PEIs in the PEI window is 4, 8 or 12.

Preferably, a PEI window is defined by at least one of: a start point determined by a first offset and a reference location; an end point determined by a second offset and the reference location; a periodicity; or a duration determined by the start point and the end point, determined by one or more higher layer parameters, equal to C times a radio frame, in which C is a positive integer, or determined by a number of PEIs in the PEI window and a period of the PEIs in the PEI window.

Preferably, a PEI window is defined by at least one of: a start point determined by a first offset and a reference location; an end point determined by a second offset and the reference location; a periodicity; or a duration determined by the start point and the end point, determined by one or more higher layer parameters, equal to C times a radio frame, in which C is a positive integer, or determined by a number of PEIs in the PEI window and a period of the PEIs in the PEI window.

Preferably, the reference location is defined by at least one of: a time domain position of the POs; a start of a PF that the POs belong to; a frame with a system frame number, SFN, in which the SFN satisfies the equation that (SFN+m) modulo M=0, M is a positive integer, and m is a non-negative value; or a time domain position of an SSB.

Preferably, the at least one PEI includes at least one of: a first bit field, indicating whether at least one of a Channel-State Information Reference Signal, CSI-RS, or a Tracking Reference Signal, TRS, is available to the wireless communication terminal in an IDLE or inactive mode; a second bit field, including an indicator, indicating the meaning of a third bit field; the third bit field, including one or more paging indications, indicating the wireless communication terminal to detect paging information in a corresponding PO or not; or a fourth bit field, providing some a common indication including a system information, SI, change information or an Earthquake and Tsunami Warning System, ETWS, information.

Preferably, the second bit field indicating the meaning of the third bit field includes: bit T indicating that the third bit field is a per-PO paging indication, and each bit in the third bit field corresponding to one of the POs; bit F indicating that the third bit field is a per-sub-group paging indication, and each bit in the third bit field corresponding to one of sub-groups of wireless communication terminals associated with one of the POs; in which bit T is 1 and bit F is 0; or bit T is 0 and bit F is 1.

Preferably, the third bit field includes: a bit in third bit field indicating one or more wireless communication terminals associated with a PO or a PO group whether to detect paging information; or a bit in third bit field indicating one or more wireless communication terminals associated with one of sub-groups of one PO whether to detect paging information.

Preferably, the wireless communication terminal detects paging information of an $n^{th}$ PO of the POs or not according to a paging indication of the at least one PEI in the PEI window or according to a paging indication of the $n^{th}$ PEI in the PEI window, in which n is a positive value.

Preferably, the wireless communication terminal detects the at least one PEI in PEI window, and the wireless communication terminal detects paging information in an $n^{th}$ PO of the POs or not according to an $n^{th}$ bit of a paging indication of the at least one PEI in the PEI window in response to the indicator indicating that each bit of the paging indication of the at least one PEI corresponds to one of the POs.

Preferably, the wireless communication terminal corresponding to an $n^{th}$ PO of the POs detects the at least one PEI and an $n^{th}$ PEI in the PEI window, and the wireless communication terminal detects paging information in an $m^{th}$ sub-group of the $n^{th}$ PO or not according to an $m^{th}$ bit of a third bit field of the $n^{th}$ PEI in response to the indicator indicating that each bit of the paging indication of the at least one PEI corresponds to one of sub-groups, and in which m is a positive value.

Preferably, the wireless communication terminal corresponds to an $n^{th}$ PO of the POs detects a $p^{th}$ PEI in the PEI window, the value of p is determined by at least one of the mapping relationships between the PEIs and the POs, one or more higher layer parameters or one or more higher layer configurations, in which p is a positive value.

Preferably, p is equal to 1, the wireless communication terminal corresponding to an $n^{th}$ PO of the POs detects the at least one PEI in the PEI window, and the wireless communication terminal detects paging information in an $n^{th}$ PO of the POs or not according to an $n^{th}$ bit of a third bit field of the at least one PEI in the PEI window in response to the at least one PEI in the PEI window corresponding to more than one of the POs.

Preferably, p is equal to n, the wireless communication terminal corresponding to an $n^{th}$ PO of the POs detects an $n^{th}$ PEI in the PEI window, and the wireless communication terminal detects paging information in an $m^{th}$ sub-group of the PO or not according to an $m^{th}$ bit of a third bit field of the $n^{th}$ PEI in the PEI window in response to that each of the PEIs corresponds to one of the POs.

Preferably, the wireless communication terminal detects the at least one PEI, and the wireless communication terminal detects paging information in an $n^{th}$ PO of the POs or not according to an $n^{th}$ bit in a paging indication of the at least one PEI in response to each bit of the paging indication of the PEI corresponds to one of the POs.

Preferably, the wireless communication terminal detects the at least one PEI and an $n^{th}$ PEI, and the wireless communication terminal detects paging information in an $m^{th}$ sub-group of an $n^{th}$ PO or not according to an $m^{th}$ bit in a paging indication of the $n^{th}$ PEI in response to each bit of the paging indication of the PEI corresponds to a sub-group.

Preferably, a first PEI has a 1st offset before a first PO or a reference location; the $n^{th}$ PEI has a $n^{th}$ offset before a first PO or an $n^{th}$ PO or the reference location, or the $n^{th}$ PEI is determined by the following equation: the offset for the $n^{th}$ PEI=1st offset−n×T in which T indicates a period of the PEIs, the reference location is defined by at least one of: a time domain position of the POs; a start of a PF that the POs belong to; a frame with an SFN, in which the SFN modulo M=0, and M is a positive integer; or a time domain position of an SSB.

Preferably, the wireless communication terminal detects paging information in an $n^{th}$ PO of the POs or not according to an $n^{th}$ bit in a paging indication of the at least one PEI in response to the at least one PEIs corresponding to more than one of the POs.

Preferably, the wireless communication terminal detects paging information in an $n^{th}$ PO of the POs or not according to a paging indication of the $n^{th}$ PEI in response to that each of the PEIs corresponds to one of the POs.

Preferably, the wireless communication terminal does not detect another PEI after successfully detecting the at least one PEI in the PEI window in response to an indicator in the PEI indicating that each bit of a paging indication of the PEI corresponds to one of the PO.

Preferably, the wireless communication node transmits the PEIs in a PEI window.

Preferably, the wireless communication node transmits the at least one PEI to the wireless communication terminal to indicate the wireless communication terminal to, based on the indicator in the at least one PEI, detect paging information of an $n^{th}$ PO of the POs or not according to a paging indication of the at least one PEI in the PEI window or according to a paging indication of an $n^{th}$ PEI in the PEI window.

Preferably, the wireless communication node transmits at least one of the at least one PEI or an $n^{th}$ PEI in the PEI window to the wireless communication terminal to indicate the wireless communication terminal to detect paging information in an $n^{th}$ PO of the POs or not according to a paging indication of the $n^{th}$ PEI in the PEI window in response to the correspondence indicator indicating that each bit of a paging indication of the at least one PEI or an $n^{th}$ PEI corresponds to one of sub-groups.

Preferably, the wireless communication node transmits at least one of the at least one PEI or an $n^{th}$ PEI in the PEI window to the wireless communication terminal to indicate the wireless communication terminal to, based on the corresponding relationship between the PEIs and the POs, detect paging information of an $n^{th}$ PO of the POs or not according to a paging indication of the at least one PEI in the PEI window or according to a paging indication of an $n^{th}$ PEI in the PEI window.

Preferably, the wireless communication node transmits the at least one PEI to the wireless communication terminal to indicate the wireless communication terminal to detect paging information in an $n^{th}$ PO of the POs or not according to an $n^{th}$ bit in a paging indication of the at least one PEI in response to at least one PEI in the PEI window corresponding to more than one of the POs.

Preferably, the wireless communication node transmits an $n^{th}$ PEI in the PEI window to the wireless communication terminal to indicate the wireless communication terminal to detect paging information in an $n^{th}$ PO of the POs or not according to a paging indication of the $n^{th}$ PEI in the PEI window in response to each of the PEIs corresponds to one of the POs.

Preferably, a number of the PEIs in the PEI window is determined by at least one of: a number of POs between two Synchronization Signal/PBCH Blocks, SSBs; one or more higher layer parameters; information transmitted by a System Information Block, SIB; a number of POs in a paging frame, PF; a number of POs between two PEI windows; a number of POs corresponding to one PEI window; a number of PFs corresponding to one PEI window; or a number of PFs between two PEI windows; or in which the number of the PEIs in the PEI window is 4, 8 or 12.

Preferably, the PEI window is defined by at least one of: a start point determined by a first offset and a reference location; an end point determined by a second offset and the reference location; or a duration determined by the start point and the end point, determined by one or more higher layer parameters, equal to M times a radio frame, or determined by a number of PEIs in the PEI window and a period of the PEIs in the PEI window.

Preferably, an offset between a start point of the PEI window and an $n^{th}$ PEI is $a+(n-1){\times}T$, in which a is an offset between the start point of the PEI window and a first PEI, and T is a period of the PEIs in the PEI window.

Preferably, the wireless communication node transmits the at least one PEI to the wireless communication terminal to indicate the wireless communication terminal to, according to an $n^{th}$ bit in a paging indication of the at least one PEI, detect paging information in an $n^{th}$ PO of the POs or not in response to each bit of the paging indication of the at least one PEI corresponds to one of the POs.

Preferably, the wireless communication node transmits the $n^{th}$ PEI to the wireless communication terminal to indicate the wireless communication terminal to, according to a paging indication of the $n^{th}$ PEI, detect paging information in an $n^{th}$ PO of the POs or not in response to each bit of the paging indication of the at least one PEI or an $n^{th}$ PEI corresponds to one of sub-groups.

Preferably, a first PEI has a 1st offset before a first PO or a reference location; the nth PEI has a nth offset before a first PO or an nth PO or the reference location, or the nth PEI is determined by the following equation: the offset for the nth PEI=1st offset−n×T in which T indicates a period of the PEIs, the reference location is defined by at least one of: a time domain position of the POs; a start of a PF that the POs belong to; a frame with an SFN, in which the SFN modulo M=0, and M is a positive integer; or a time domain position of an SSB.

Preferably, the wireless communication node transmits the at least one PEI to the wireless communication terminal to indicate the wireless communication terminal to, according to an $n^{th}$ bit in a paging indication of the at least one PEI, detect paging information in an $n^{th}$ PO of the POs or not in response to the at least one PEI indicating more than one of the POs.

Preferably, the wireless communication node transmits the $n^{th}$ PEI to the wireless communication terminal to indicate the wireless communication terminal to, according to a paging indication of the $n^{th}$ PEI, detect paging information in an $n^{th}$ PO of the POs or not in response to that each of the PEIs indicates to one of the POs.

Preferably, the at least one PEI includes an indicator indicating whether at least one of a Channel-State Information Reference Signal, CSI-RS, or a Tracking Reference Signal, TRS, is available to the wireless communication terminal in an IDLE or inactive mode.

Preferably, the correspondence indicator in the at least one PEI indicates each bit of a paging indication of the at least one PEI corresponding to one of the POs or corresponding to one of sub-groups of wireless communication terminals corresponding to one of the POs.

Preferably, in response to each bit of a paging indication of the at least one PEI corresponding to one of the POs, a number of bits in the paging indication is determined by a number of POs correspond to the at least one PEI, one or more higher layer parameters, a number of PFs related to the at least one PEI, or a number of POs in each PF.

Preferably, in response to each bit of a paging indication of the at least one PEI corresponding to one of sub-groups of wireless communication terminals corresponding to one of the POs, a number of bits in the paging indication is determined by a number of the sub-groups corresponding to one of the POs, a maximum number of the sub-groups corresponding to one of the POs, or one or more higher layer parameters.

Preferably, a number of bits in a paging indication is determined by at least one of: a number of POs associated with one of the PEIs; a maximum number of POs able to be associated with one of the PEIs; a number of the sub-groups corresponding to one of the POs; a maximum number of the sub-groups corresponding to one of the POs; a larger value of the number of POs associated with one of the PEIs and the number of the sub-groups corresponding to one of the POs; a larger value of a maximum number of POs able to be associated with one of the PEIs and the number of the sub-groups corresponding to one of the POs; or a larger value of a maximum number of POs able to be associated with one of the PEIs and the maximum number of the sub-groups corresponding to one of the POs.

The present disclosure relates to a computer program product including a computer-readable program medium code stored thereupon, the code, when executed by a processor, causing the processor to implement a wireless communication method recited in any one of foregoing methods.

The exemplary embodiments disclosed herein are directed to providing features that will become readily apparent by reference to the following description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

The above and other aspects and their implementations are described in greater detail in the drawings, the descriptions, and the claims.

BRIEF DESCRIPTION OF THE DRAWINGS

FIG. 11 shows a flowchart of a wireless communication method according to an embodiment of the present disclosure.

FIG. 12 shows a flowchart of another wireless communication method according to an embodiment of the present disclosure.

DETAILED DESCRIPTION

In some embodiments, the UE monitors one paging occasion (PO) per discontinuous reception (DRX) cycle (i.e., paging cycle). A UE corresponds to an PO means that the UE monitor the paging PDCCH in the PO. One paging frame (PF) is one Radio Frame (RF) and may contain one or multiple POs or one or multiple starting points of POs.

The PF and PO for paging are determined by the following formulas:

The System Frame Number (SFN) for the PF is determined by: (SFN+PF_offset) mod $T0=(T0$ div $N0)\times(\text{UE\_ID mod } N0)$ Index $(i\_s)$ indicating the index of the PO is determined by: $i\_s=\text{floor (UE\_ID}/N0) \text{ mod } Ns0$ T0 denotes the number of radio frames of the DRX cycle for the UE, N0 denotes the number of total paging frames in the DRX cycle for the UE, Ns0 denotes the number of paging occasions for a PF, PF_offset denotes the offset used for PF determination, UE_ID denotes the $5^{th}$ Generation System Temporary Mobile Subscription Identifier (5G-S-TMSI) mod 1024, mod denotes a modulo function, div denotes a function calculating the value of the quotient, and floor denotes a floor function.

The value of N0×Ns0 determined the number of POs in a DRX cycle, which is the density of POs in the DRX cycle. For example, assuming the DRX cycle is 128 radio frames, if the parameter N0 is configured as oneT (i.e., N0=T0) and

8

Figure 1:
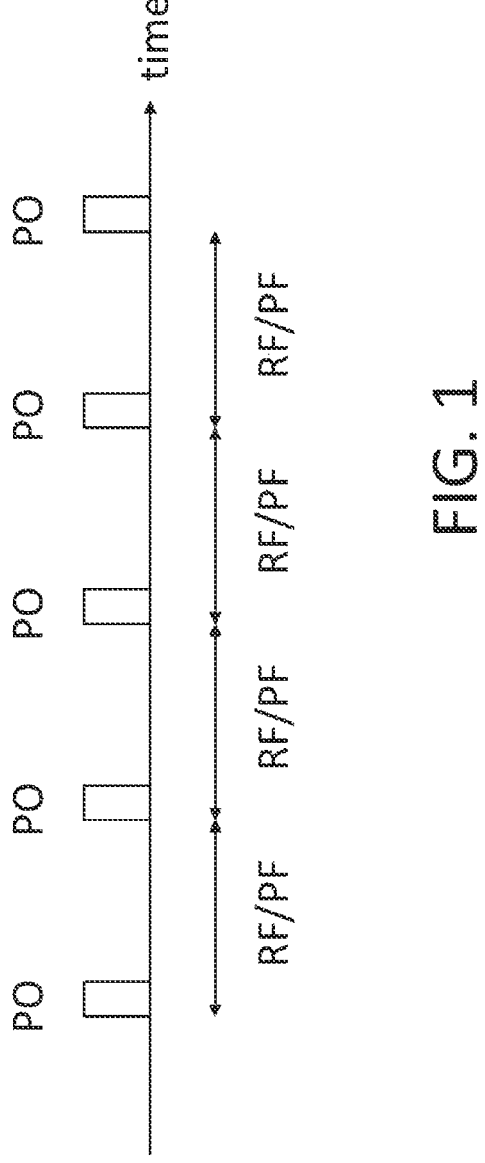
FIG. 1 shows a schematic diagram of POs according to an embodiment of the present disclosure.
Figure 2:
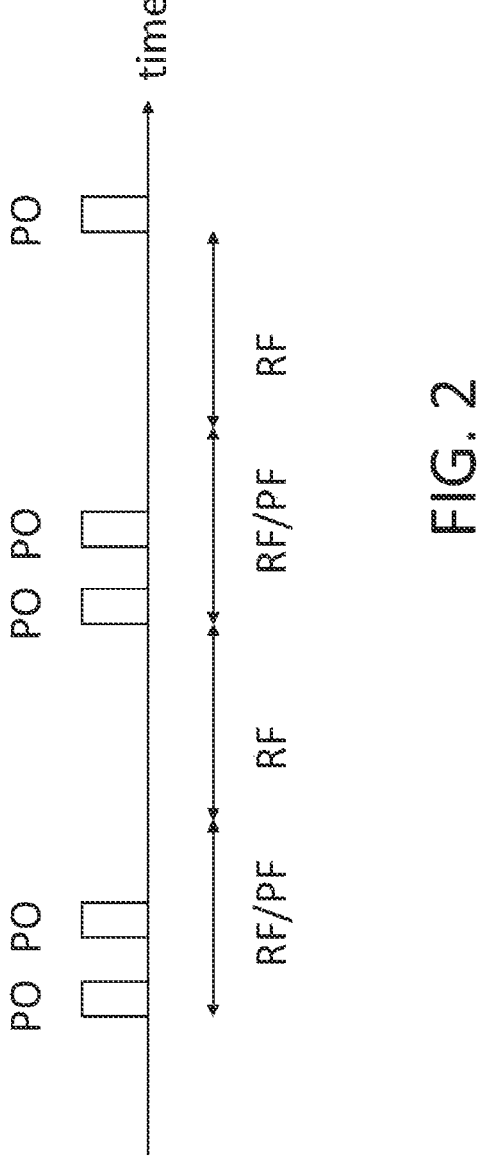
FIG. 2 shows a schematic diagram of POs according to another embodiment of the present disclosure.

Ns0 is four, the number of POs in a DRX cycle is 512. If the parameter N0 is configured as oneSixteenthT (i.e., N0=$\frac{1}{16}$T) and the Ns0 is 1, the number of POs in a DRX cycle is 8. For example, when N0 is configured as oneT, and Ns0 is configured as one, the number of PF is equal to the radio frames in one DRX cycle, and each PF contains one PO (as shown in FIG. 1). When N0 is configured as halfT, and Ns0 is configured as two, the number of PF is equal to a half of radio frames in one DRX cycle, and each PF contains two POs (as shown in FIG. 2).

When SearchSpaceId=0 is configured for the parameter pagingSearchSpace, Ns0 is either 1 or 2. For Ns0=1, there is only one PO which starts from the first physical downlink control channel (PDCCH) monitoring occasion for paging in the PF. For Ns0=2, PO is either in the first half frame (i.e., i_s=0) or the second half frame (i.e., i_s=1) of the PF.

When SearchSpaceId other than 0 is configured for the parameter pagingSearchSpace, the UE monitors the $(i\_s+1)^{th}$ PO.

To reduce the power consumption caused by the UE monitoring unnecessary POs, an indication such as a paging early indication (PEI) can be transmitted to the UE before the POs. The PEI can inform the UE whether to wake up and monitor the POs.

One PEI in embodiments of the present disclosure can be one PEI burst which contains one or more PEI occasion. In some cases, the multiple PEI occasions in one PEI burst are the same to each other. For example, the multiple PEI occasions carry the same indication information, and have the same beam direction, quasi-colocation (QCL) information and TCI states. In some cases, the multiple PEI occasions in one PEI burst carry the same indication information but have different beams, quasi-colocation (QCL) information, and/or TCI states.

Scheme 1

Scheme 1—Aspect 1: PEI Window

In some embodiments, a PEI window may be adopted, and the gNB (gNodeB) transmits the PEIs ad UE detects the PEIs in the PEI window.

In an embodiment, the PEI window contains N PEIs, where N is an integer equal to or greater than 0. The value of N is related to at least one of: a number of POs between two Synchronization Signal/PBCH Blocks, SSBs; one or more higher layer parameters; information transmitted by a System Information Block, SIB; a number of POs in a paging frame (PF), which is hereinafter referred to as Ns; a number of POs between two PEI windows; a number of POs corresponding to one PEI window; a number of PFs corresponding to one PEI window; a number of PFs between two PEI windows; a PEI transmission mechanism; a resource load of the gNB; a number of beams; or a maximum of an SSB index.

In some embodiments, the number of PEIs in the PEI window (i.e., the value of N) is equal to the number of POs between two SSBs. In some embodiments, the value of N is the multiple of the number of POs between two SSBs. In some embodiments, the number of POs between two SSBs is a multiple of N, for example, N=ceil(the number of POs between two SSBs/2), in which ceil denotes a ceil function.

In some embodiments, the higher layer parameters may be RRC (Radio Resource Control) parameters. In some embodiments, the higher layer parameters may be MAC CE (Medium Access Control Control Element) parameters.

In some embodiments, the number of PEIs in the PEI window (i.e., the value of N) is determined by one or more higher layer parameters. For example, when an RRC parameter indicates that the number or the maximum number of POs associated with one PEI is P, the value of N may be equal to P or equal to P+1.

In some embodiments, the number of PEIs in the PEI window (i.e., the value of N) is equal to X times the number of POs in one PF (i.e., $N=X \times Ns$), where X is an integer larger than or equal to one. The UEs corresponding to the POs on the same PF have similar timelines. The ideal PEI positions for the UEs that monitors POs on the same PF are close. When considering the PEI position, a higher power saving gain can be obtained by taking a PF as a unit. Specifically, if one PEI indicates the paging operation for one PO, the number of PEIs in the PEI window is the same as the number of the corresponding POs. When the PEI window is associated with X PFs, the number of PEIs in the PEI window $N=X \times Ns$. In this manner, a greater power saving gain and smaller resource overhead can be obtained.

In some embodiments, the number of PEIs in the PEI window (i.e., the value of N) is equal to X times the number of POs in one PF plus a positive integer (e.g., $N=X \times Ns+1$), where X is an integer larger than or equal to one. In this way, one or more PEIs can be used to indicate public information, and other PEIs can indicate the operation related to each PO when one PEI is associated with one PO.

In some embodiments, the number of PEIs in the PEI window (i.e., the value of N) is equal to X times the number of POs correspond to one PEI window (i.e., $N=X \times NP$), where X is an integer larger than or equal to one. In some embodiments, the value of N is equal to X times the number of POs in one PF plus a positive integer (e.g., $N=X \times NP+1$), where X is an integer larger than or equal to one.

In some embodiments, the number of PEIs in the PEI window (i.e., the value of N) is determined by the PEI transmission mechanism. For example, for a PEI is transmitted only when the UE needs to monitor the paging PDCCH, and for a PEI is transmitted only when the UE does not need to monitor the paging PDCCH, the value of N are different. In some embodiments, the value of N is determined by the resource load of the gNB. In some embodiments, the value of N is determined by the number of beams or the maximum of the SSB index.

In some embodiments, the number of PEIs in the PEI window (i.e., the value of N) is equal to X times the number of POs in one PF or the value of N is equal to X times the number of POs in one PF plus a positive integer. In one case, X is determined by the PF numbers corresponding to one PEI window. For example, X is equal to or is a multiple of the PF numbers corresponding to one PEI window. In another case, X is determined by the PF numbers between two PEI windows.

In some embodiments, there is no PEI transmission requirement within the PEI window, the gNB would not transmit the PEI within the PEI window, and the UE would not detect the PEI at the corresponding position. In this case, the number of PEIs within the PEI window is 0.

In some embodiments, the value of N may be configured as 4, 8, or 12. In some embodiments, the value of N is a fixed number, such as 4, 8, 12. The UEs corresponding to the POs on the same PF has similar timeline. Therefore, the optimal PEI position of the UEs that monitors POs on the same PF is close. When considering the PEI position, a higher power saving gain can be obtained by using PF as the unit. One PF can be configured with one, two or four POs. Therefore, when N is set to 4, the number of PEIs is an integral multiple of the number of POs in the PF, which ensures that there is no great loss or difference in power saving gain. For one PO, a maximum of 8 sub-groups can be configured. When the paging indication bit field of the PEI can be flexibly configured to indicate a PO or a sub-group, at least eight bits are required. In some cases, these 8 bits can indicate 8 POs. If one PEI indicate only one PO, eight PEIs are required to indicate eight POs. Similarly, the minimum number of information bits of DCI-based PEI is 12. When each bit indicates a PO, one PEI is required. When each PEI indicates a PO, 12 PEIs are required to implement the same function.

In some embodiments, the PEI window has at least one of a start point, an end point, or a duration.

In an embodiment, the start point of the PEI window is indicated or determined by a first offset. The first offset is the distance between the start point of the PEI window and a reference location. In some embodiments, the reference location is the first PO that the PEI window corresponds to. In some embodiments, the reference location is the start of the PF that the first PO belongs to. In some embodiments, the reference location is determined by (SFN+m) mod M=0, where M is a positive integer, m is an integer, in some cases m=0. In some embodiments, the value of M is related to the DRX cycle T_DRX and the number of total paging frames in DRX cycle N_PF. For example, $M=x \times T\_DRX/N\_PF$, where x is a positive integer. In a case where x=1, the number of the reference locations is equal to the number of PFs in the DRX cycle. That is, each PF corresponds to one reference location. In another case where x>1, e.g., x=2, every two PFs corresponds to one reference location. In some embodiments, the reference location is the time domain position of the SSB (e.g., presented by a slot number). When there are multiple reference points in a DRX cycle, the UE can select the nearest reference point or the first reference point before the PO monitored by the UE.

In an embodiment, the start point of the PEI window is the radio frame (RF) with SFN mod M=0, where M is a positive integer.

In an embodiment, the end point of the PEI window is indicated or determined by a second offset. The second offset is the distance between the end of the PEI window and a reference location. In some embodiments, the reference location is the first PO that the PEI window corresponds to. In some embodiments, the reference location is the beginning of the PF that the first PO belongs to. In some embodiments, the reference location is determined by (SFN+m) mod M=0, where M is a positive integer, m is an integer, in some cases m=0. In some embodiments, the value of M is related to the DRX cycle T_DRX) and the number of total paging frames in DRX cycle N_PF. For example, $M=x \times T\_DRX/N\_PF$, where x is a positive integer. In a case where x=1, the number of the reference locations is equal to the number of PFs in the DRX cycle. That is, each PF corresponds to one reference location. In another case where x>1, e.g., x=2, every two PFs corresponds to one reference location. In some embodiments, the reference location is the time domain position of the SSB (e.g., presented by a slot number). When there are multiple reference points in a DRX cycle, the UE can select the nearest reference point or the first reference point before the PO monitored by the UE.

In an embodiment, the end point of the PEI window is the radio frame (RF) with SFN mod M=0, where M is a positive integer.

In an embodiment, the end point of the PEI window is determined by the start point and the duration of the PEI window.

In an embodiment, the duration of the PEI window is equal to the difference between the start point of the PEI window and the end point of the PEI window.

In an embodiment, the duration of the PEI window is determined by the start point and the end of the PEI window. For example, the duration is equal to the larger value between the first offset and the second offset minus the smaller value. That is, the duration of the PEI window is the value of the first offset minus the value of the second offset. Alternatively, the duration of the PEI window is equal to the value of the second offset minus the value of the first offset.

In an embodiment, the duration of the PEI window is determined by one or more higher layer parameters. For example, a higher layer parameter indicates that the length of the duration.

In an embodiment, the duration of the PEI window is equal to M times radio frame (RF), where M is an integer larger than or equal to one.

In an embodiment, the duration of the PEI window is determined by the number of PEIs in the PEI window and/or determined by the period of the PEIs.

In some embodiments, the PEI window is periodic.

In some embodiments, there are SSB processing opportunities between the end point of the PEI window and the PO. That is, SSBs may be processed between the end point of the PEI window and the PO.

Scheme 1—Aspect 2: PEI Occasion and PEI Format

In some embodiments, the PEIs in PEI window are periodical. Suppose that the period of the PEIs is T_W, and the offset between the start position of the first PEI in the PEI window and the start position of the PEI window is a, the offset between the start position of the $n^{th}$ PEI and the start position of the PEI window is a+(n−1)×T_W. When the value of T_W equals the number of the PEI occasions in one PEI burst, the PEI positions in the PEI window are continuous.

Figure 3:
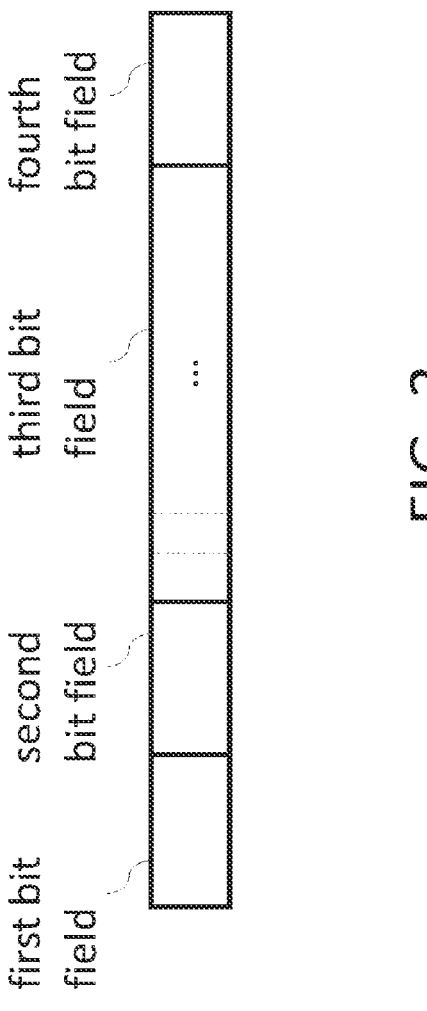
FIG. 3 shows a schematic diagram of a PEI according to an embodiment of the present disclosure.

In some embodiments, the PEI is a piece of DCI (Downlink Control Information) or has a format similar or identical to a piece of DCI. The PEI includes at least one of a first bit field, a second bit field, a third bit field, or a fourth bit field (as illustrated in FIG. 3).

In some embodiments, the first bit field is used to indicate whether the CSI-RS (Channel-State Information Reference Signal) and/or the TRS (Tracking Reference Signal) is available to the UE in the IDLE mode and/or the inactive mode. In some embodiments, the CSI-RS and/or the TRS is configured for the connected mode. In some embodiments, a bit with a value A indicates that the CSI-RS and/or the TRS is available to the UE in the IDLE mode and/or the inactive mode, and a bit with a value B indicates that the CSI-RS and/or the TRS is not available to the UE in the IDLE mode and/or the inactive mode. In some embodiments, the bit with a value A indicates that whether the CSI-RS and/or the TRS is available to the UE in the IDLE mode and/or the inactive mode is the same as in the previous period. The bit with a value B indicates whether the CSI-RS and/or the TRS is available to the UE in the IDLE mode and/or the inactive mode is reversed as in the previous period. In the above description, A is 0 and B is 1, or A is 1 and B is 0.

In some embodiments, the second bit field is used to indicate the meaning or configuration of the third bit field. In some embodiments, a bit with a value "1" indicates that the third bit field is a per-PO paging indication, a bit with a value "0" indicates that the third bit field is a per-sub-group paging indication. In some embodiments, a bit with a value "0" indicates that the third bit field is the per-PO paging indication, a bit with a value "1" indicates that the third bit field is the per-sub-group paging indication. Details of the per-PO paging indication and the per-sub-group paging indication is described in the paragraphs below.

In some embodiments, the third bit field is a per-PO paging indication or a per-sub-group paging indication. For example, when the third bit field is a per-PO paging indication, each bit in the third bit field corresponds to one PO, and one bit in the third bit field indicates whether the UEs corresponding to a certain PO should monitor the paging PDCCH in this PO. When the third bit field is a per-sub-group paging indication, and there are multiple sub-group of UEs corresponding to one PO, each bit in the third bit field corresponds to a sub-group of UEs, and one bit in the third bit field indicates whether the UEs of the sub-group corresponding to a certain PO should monitor the paging PDCCH in this PO.

When the third bit field is the per-PO paging indication, the number of bits in the third bit field can be determined by at least one of: the number of POs related to one PEI (e.g., the first PEI in the PEI window) (e.g., the number of bits in the third bit field is equal to the number of POs corresponding to one PEI); a higher layer parameter; or the number of the PFs related to one PEI (e.g., the first PEI in the PEI window) and the number of POs in each PF.

In some embodiments, when the third bit field is the per-PO paging indication, and the number of POs associated with one PEI is smaller than the number of bits in the third bit field, the excessive bits in the third bit field may be set to 0.

When the third bit field is the per-sub-group paging indication, the number of bits in the third bit field can be determined by at least one of: the number of sub-groups corresponding to one PO; a higher layer parameter; or when the numbers of sub-groups corresponding to each POs are different, the largest value among the number of sub-groups corresponding to one PO.

In some embodiments, when the third bit field is the per-sub-group paging indication, and the number of sub-group corresponding to one PO is smaller than the number of bits in the third bit field, the excessive bits in the third bit field may be set to 0.

In some embodiments, the number of bits in the third bit field can be determined by at least one of: the number of POs associated with one of the PEIs; the maximum number of POs able to be associated with one of the PEIs; the number of the sub-groups corresponding to one of the POs; the maximum number of the sub-groups corresponding to one of the POs; the larger value of the number of POs associated with one of the PEIs and the number of the sub-groups corresponding to one of the POs; the larger value of a maximum number of POs able to be associated with one of the PEIs and the number of the sub-groups corresponding to one of the POs; or the larger value of a maximum number of POs able to be associated with one of the PEIs and the maximum number of the sub-groups corresponding to one of the POs.

In some embodiments, the fourth bit field can provide some common indications, such as SI (system information) change information or EWTS (Earthquake and Tsunami Warning System) information.

Scheme 1—Aspect 3: UE and gNB operations

Case 1:

The UE detects the PEI at the time-frequency resource of at least one PEI in the PEI window. To simplify the description, the first PEI in the PEI window is used as an example in the description below, but the present disclosure is not limited to this. In an embodiment, the first PEI may be the first PEI transmitted in the PEI window in time domain. In an embodiment, the first PEI may be the first PEI in time domain successfully or completely received by the UE.

Figure 4:
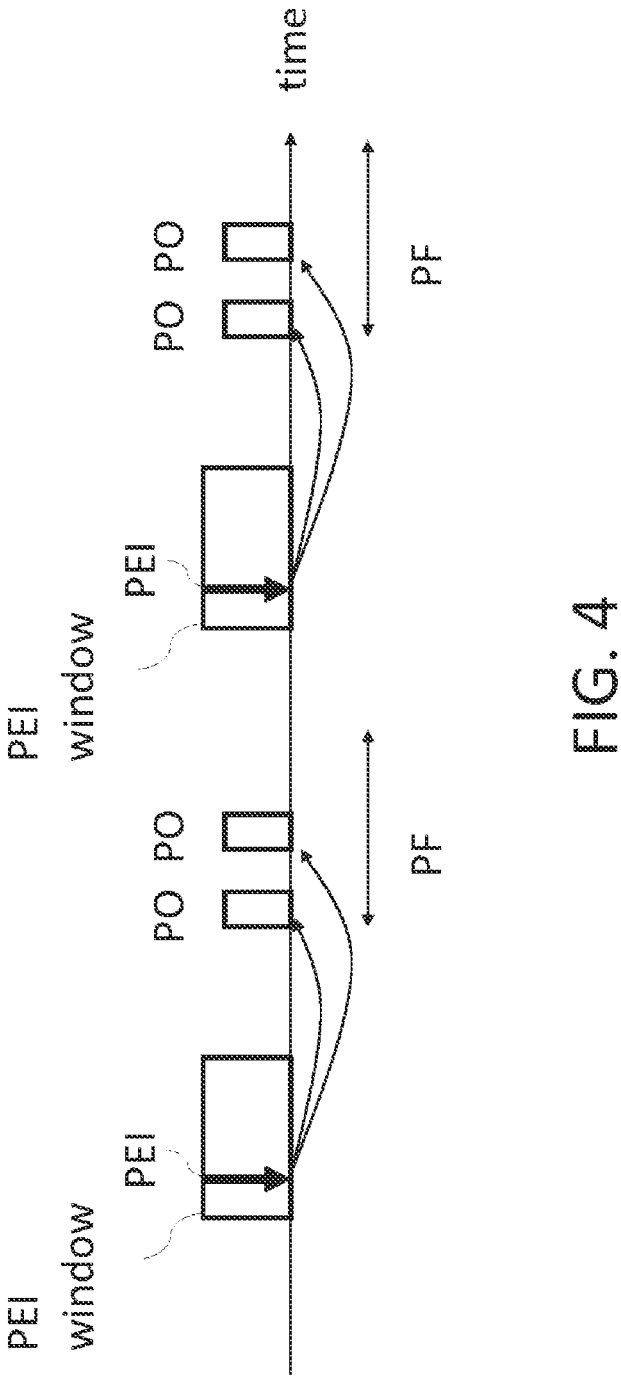
FIG. 4 shows a relationship between PEIs and POs according to an embodiment of the present disclosure.
Figure 5:
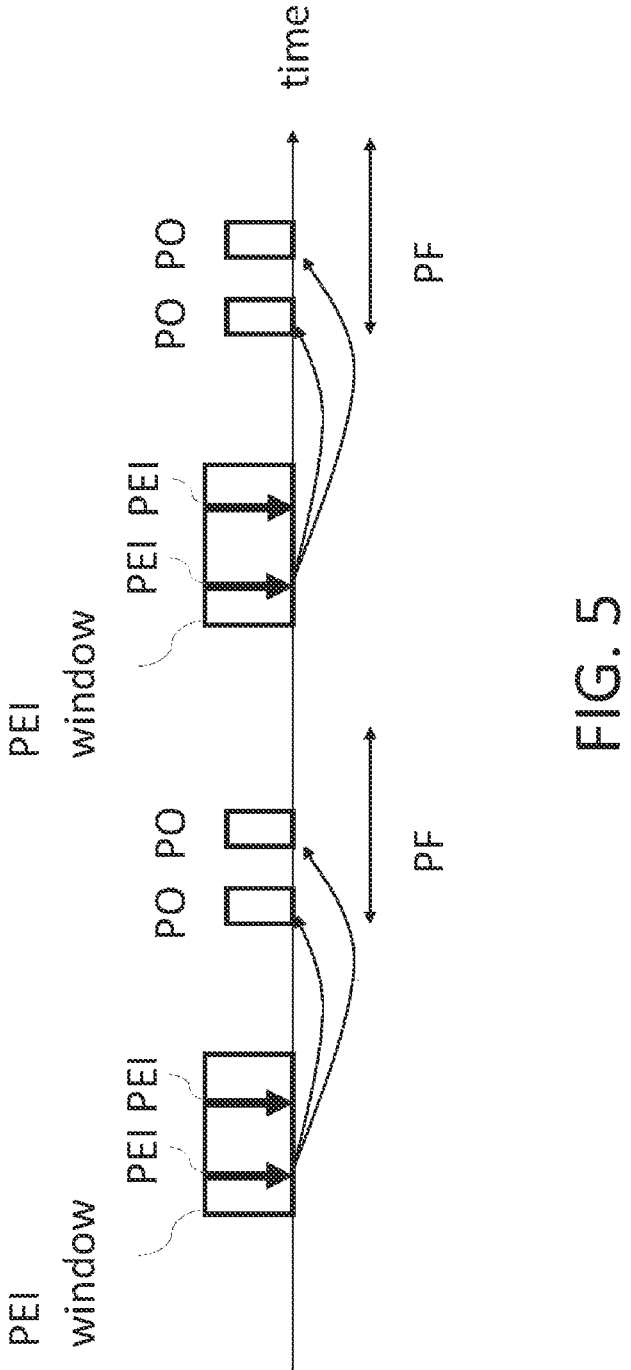
FIG. 5 shows a relationship between PEIs and POs according to another embodiment of the present disclosure.

Case 1.1:

If the second bit field of the first PEI indicates that the third field is the per-PO paging indication, the UE performs operations in accordance with the indication of the third bit field of the first PEI (see FIG. 4 and FIG. 5).

In an embodiment, the UE corresponding to the $n^{th}$ PO associated with the first PEI determines whether to receive the paging PDCCH according to the $n^{th}$ bit in the third bit field of the first PEI. In other words, the $n^{th}$ bit in the third bit field of the first PEI indicates the UE to receive the paging PDCCH or not.

In some embodiments, if the UE detects the first PEI successfully, the UE may not receive the other PEIs in the PEI window. In some embodiments, the gNB may only transmit one PEI in the PEI window (see FIG. 4). In some embodiments, the gNB may transmit multiple PEIs in the PEI window, and the PEIs in the PEI window carry the same indication information.

In some embodiments, the gNB may transmit multiple PEIs in the PEI window. When the first PEI fails to be detected, the UE detects the second PEI in the PEI window. The UE can combine the PEI information received from multiple PEIs to improve PEI detection reliability.

Although two PEIs in one PEI window is taking as an example in FIG. 5, the present disclosure is not limited by this.

Case 1.2:

If the second bit field in the first PEI indicates that the third bit field is the per-sub-group paging indication, the UE corresponding to the first PO performs the operation according to the paging indication in the third bit field of the first PEI. In some embodiments, the UE corresponding to the $n^{th}$ PO detects the $n^{th}$ PEI in the PEI window, and performs operations in accordance with the paging indication of the third bit field of the $n^{th}$ PEI (see FIG. 6). In some embodiments, the UE corresponding to the $n^{th}$ PO may detect the $(n+1)^{th}$ PEI in the PEI window.

In some embodiments, the UE of a sub-group m performs the operation according to the $m^{th}$ bit in the third bit field of the corresponding PEI, in which the operation includes detecting the paging PDCCH, or not detecting the paging PDCCH.

In some embodiments, when the third bit field is the per-sub-group paging indication, each PEI carries paging indication corresponding to one PO.

In some embodiments, the bit fields in the first PEI and other PEIs are the same. In some embodiments, the bit fields in the first PEI and other PEIs are different. For example, when the second bit field in the first PEI indicates that the third bit field is the per-sub-group paging indication, except for the first PEI, the other PEIs in the PEI window may not include the second bit field. For another example, except for the first PEI, the other PEIs in the PEI window may only contain the third bit field.

Figure 6:
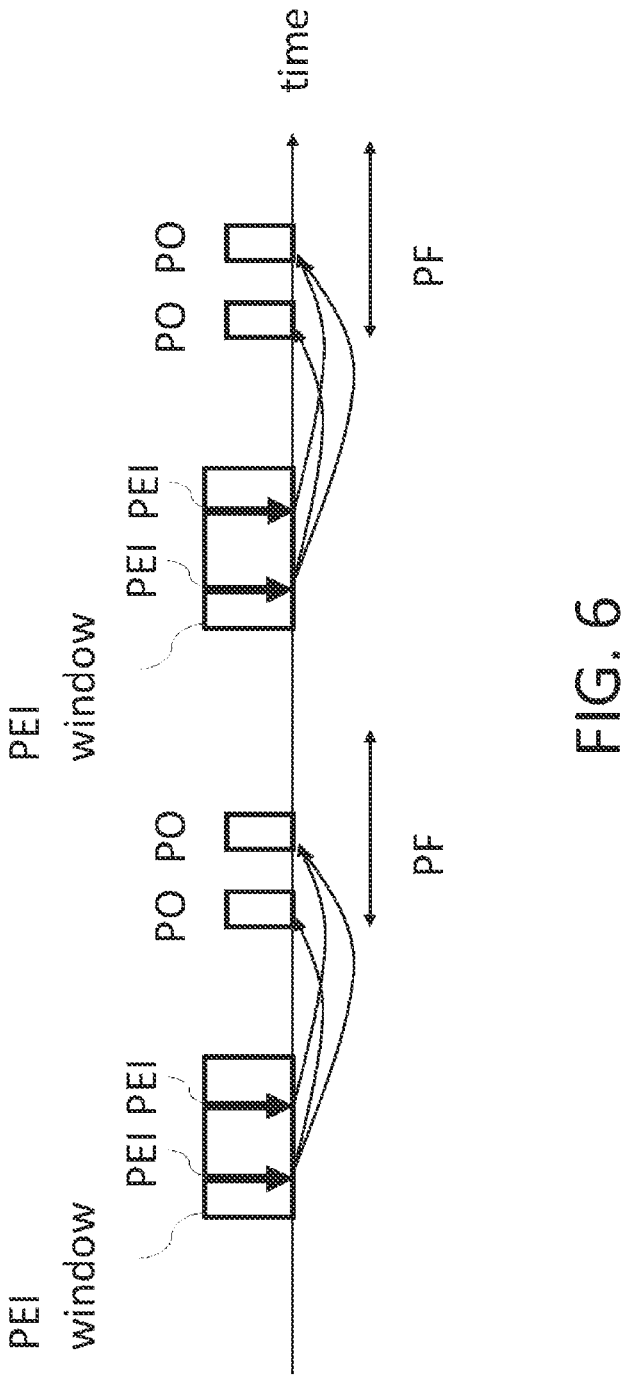
FIG. 6 shows a relationship between PEIs and POs according to another embodiment of the present disclosure.

Although two PEIs in one PEI window is illustrated as an example in FIG. 6, the present disclosure is not limited by this. Besides, although the $2^{nd}$ PEI is illustrated as an example of the $n^{th}$ PEI in FIG. 6, the present disclosure is not limited by this.

Case 2:

In some embodiments, the UE may detect the PEIs at PEI locations. The location of the PEI that the UE detects is related to the mapping relationships between PEI and PO, one or more higher layer parameters, or other configurations. When the mapping relationship between the PEI and the PO is 1-to-1, the UE corresponding to the $n^{th}$ PO receives the $n^{th}$ PEI in the PEI window. When the mapping relationship between the PEI and the PO is 1-to-K, in which K is a positive integer larger than one, the UE receives the first PEI in the PEI window. In the above description, the mapping relationship between the PEI and the PO is 1-to-1 means that each PO corresponds to an independent PEI. The mapping relationship between the PEI and the PO is 1-to-K means that one PEI can indicate operations of the UEs corresponding to multiple POs (e.g., K POs).

Case 2.1:

If the mapping relationship between the PEI and the PO is 1-to-K as described above, the UE detects the first PEI. The third bit field in the first PEI is the per-PO paging indication.

In some embodiments, the UE corresponding to the $n^{th}$ PO associated with the first PEI determines whether to receive the paging PDCCH according to the $n^{th}$ bit in the third bit field in the first PEI. In other words, the $n^{th}$ bit in the third bit field of the first PEI indicates the UE to receive the paging PDCCH or not.

Case 2.2:

If the mapping relationship between the PEI and the PO is 1-to-1 as described above, the UE detects the $n^{th}$ PEI. The third bit field in the $n^{th}$ PEI is the per-sub-group paging indication.

In some embodiments, the UE of sub-group m performs the operation according to the $m^{th}$ bit in the third bit field of the $n^{th}$ PEI, in which the operation includes detecting the paging PDCCH, or not detecting the paging PDCCH.

In some embodiments, in Case 1 or Case 2 above, the position of the PEI window can be determined by any two configurations of the start point of the PEI window, the end position of the PEI window and the duration of the PEI window. By obtaining a reference location, the UEs that process different POs can find the reference location, and then determine the position of the PEI window and receive the corresponding PEI. In this way, there is no need to configure the distance between each PO and PEI, such that the number of required parameters and system complexity can be reduced. The paging indication (i.e., the third bit field) of the PEIs can express different meanings in different scenarios, so as to ensure the flexibility of the paging indication and meet the requirements of different scenarios. Reasonable configuration can ensure the stability of DCI length, reduce the number of UE blind detections, reduce the UE complexity, and reduce power consumption.

Scheme 2

Scheme 2—Aspect 1: PEI Occasion and Format

In some embodiments, the time resources of the PEIs are periodical, and the period of the PEIs is T. In some embodiments, the length of RF (radio frame) is an integral multiple of the PEI period. That is, $T=(1/x)\times$the length of RF, where x is a positive integer.

In some embodiments, the PEI is a piece of DCI or has a format similar or identical to a piece of DCI. The PEI includes at least one of a first bit field, a second bit field, a third bit field, or a fourth bit field.

In some embodiments, the first bit field is used to indicate whether the CSI-RS (Channel-State Information Reference Signal) and/or the TRS (Tracking Reference Signal) is available to the UE in the IDLE mode and/or the inactive mode. In some embodiments, the CSI-RS and/or the TRS is configured for the connected mode. In some embodiments, a bit with a value A indicates that the CSI-RS and/or the TRS is available to the UE in the IDLE mode and/or the inactive mode, and a bit with a value B indicates that the CSI-RS and/or the TRS is not available to the UE in the IDLE mode and/or the inactive mode. In some embodiments, the bit with a value A indicates that whether the CSI-RS and/or the TRS is available to the UE in the IDLE mode and/or the inactive mode is the same as in the previous period. The bit with a value B indicates that whether the CSI-RS and/or the TRS is available to the UE in the IDLE mode and/or the inactive mode is reverse as in the previous period. In the above description, A is 0 and B is 1, or A is 1 and B is 0.

In some embodiments, the second bit field is used to indicate the meaning or configuration of the third bit field. In some embodiment, a bit with a value "1" indicates that the third bit field is the per-PO paging indication, a bit with a value "0" indicates that the third bit field is the per-sub-group paging indication. In some embodiment, a bit with a value "0" indicates that the third bit field is the per-PO paging indication, a bit with a value "1" indicates that the third bit field is the per-sub-group paging indication.

In some embodiments, the third bit field is the per-PO paging indication or the per-sub-group paging indication. For example, when the third bit field is the per-PO paging indication, each bit in the third bit field corresponds to one PO, and one bit in the third bit field indicates whether the UEs corresponding to a certain PO should monitor the paging PDCCH in this PO. When the third bit field is the per-sub-group paging indication, and there are multiple sub-group of UEs corresponding to one PO, each bit in the third bit field corresponds to a sub-group of UEs, and one bit in the third bit field indicates whether the UEs the sub-group corresponding to a certain PO should monitor the paging PDCCH in this PO.

When the third bit field is the per-PO paging indication, the number of bits in the third bit field can be determined by at least one of: the number of POs related to one PEI (e.g., the first PEI) (e.g., the number of bits in the third bit field is equal to the number of POs corresponding to one PEI); a higher layer parameter; the number of POs in one PF; or the number of the PFs related to one PEI (e.g., the first PEI) and the number of POs in each PF.

In some embodiments, when the third bit field is the per-PO paging indication, and the number of POs associated with one PEI is smaller than the number of bits in the third bit field, the excessive bits in the third bit field may be set to 0.

When the third bit field is the per-sub-group paging indication, the number of bits in the third bit field can be determined by at least one of: the number of sub-groups corresponding to one PO; a higher layer parameter; or when the numbers of sub-groups corresponding to each POs are different, the largest value among the number of sub-groups corresponding to one PO.

In some embodiments, when the third bit field is the per-sub-group paging indication, and the number of sub-group corresponding to one PO is smaller than the number of bits in the third bit field, the excessive bits in the third bit field may be set to 0.

In some embodiments, the number of bits in the third bit field can be determined by at least one of: the number of POs associated with one of the PEIs; the maximum number of POs able to be associated with one of the PEIs; the number of the sub-groups corresponding to one of the POs; the maximum number of the sub-groups corresponding to one of the POs; the larger value of the number of POs associated with one of the PEIs and the number of the sub-groups corresponding to one of the POs; the larger value of a maximum number of POs able to be associated with one of the PEIs and the number of the sub-groups corresponding to one of the POs; or the larger value of a maximum number of POs able to be associated with one of the PEIs and the maximum number of the sub-groups corresponding to one of the POs.

In some embodiments, the fourth bit field can provide some common indications, such as SI change information or EWTS information.

Scheme 2—Aspect 2: UE and gNB operations

Case 1:

The UE detects the PEI at the time-frequency resource of at least one PEI. To simplify the description, the first PEI is used as an example in the description below, but the present disclosure is not limited to this. In an embodiment, the first PEI may be the first PEI for a certain PF in time domain. In an embodiment, the first PEI may be the first PEI for a certain PF in time domain successfully or completely received by the UE.

The UE detects the first PEI at a PEI location. The time location of the first PEI is indicated by an offset. The offset is a distance between the start point of the first PEI and a reference location. In some embodiments, the reference location is a start point of a corresponding PF. In some embodiments, different reference locations corresponding to different PFs may have different offsets. In some embodiments, the reference location is a radio frame (RF) having an SFN mod M=0, M is a positive integer. In some embodiments, the reference location is an SFN mod M=0, M is a positive integer. In some embodiments, the reference location is the time domain position of the SSB (e.g., presented as a slot number). In some embodiments, the value of M is related to the DRX cycle T_DRX and the number of total paging frames in the DRX cycle N_PF. For example, M=x× T_DRX/N_PF, where x is a positive integer. In a case where x=1, the number of reference locations is equal to the number of PFs in the DRX cycle. That is, each PF corresponds to one reference location. In another case where x>1, e.g., x=2, every two PFs corresponds to one reference location. When there are multiple reference points in a DRX cycle, the UE can select the nearest reference point or the first reference point before the PO monitored by the UE.

Figure 7:
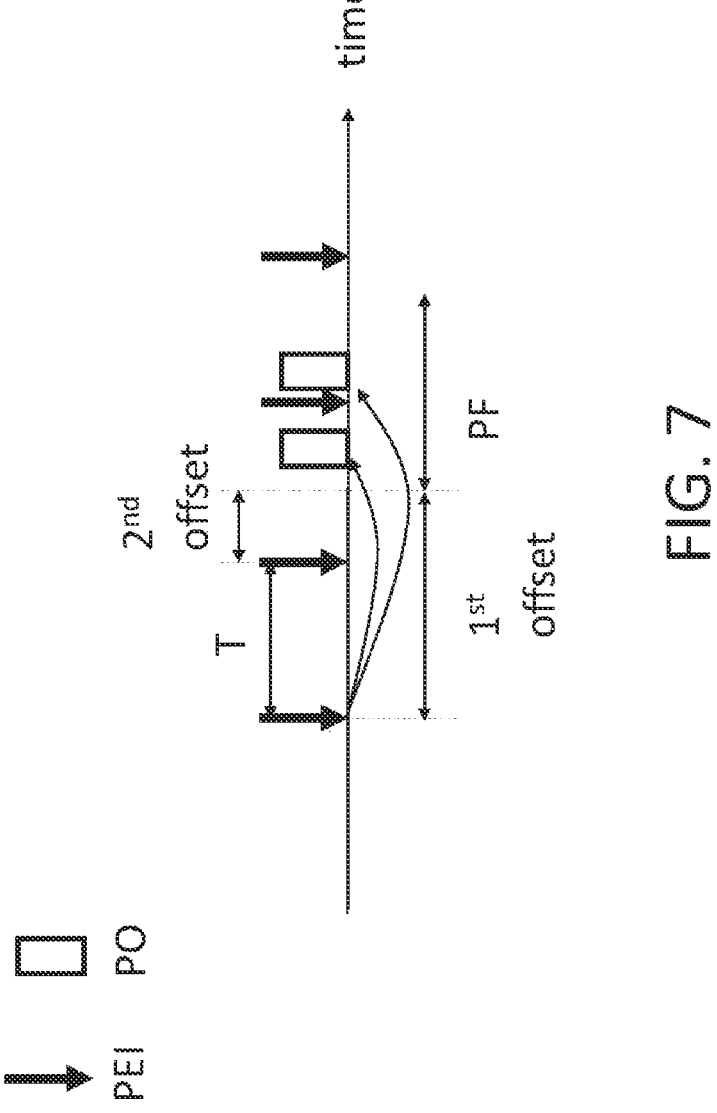
FIG. 7 shows a relationship between PEIs and POs according to another embodiment of the present disclosure.

Case 1.1:

If the second bit field of the first PEI indicates that the third field is the per-PO paging indication, the UE performs operations in accordance with the indication of the third bit field of the first PEI (see FIG. 7).

In an embodiment, the UE corresponding to the $n^{th}$ PO associated with the first PEI determines whether to receive the paging PDCCH according to the $n^{th}$ bit in the third bit field.

In some embodiments, if the UE detects the first PEI successfully, the UE may not receive the other PEIs. In some embodiments, the gNB may only transmit one PEI when the second bit field of the first PEI indicates that the third bit field is the per-PO paging indication. In some embodiments, the gNB may transmit multiple PEIs in the PEI window, and the PEIs in the PEI window carry the same indication information.

Figure 8:
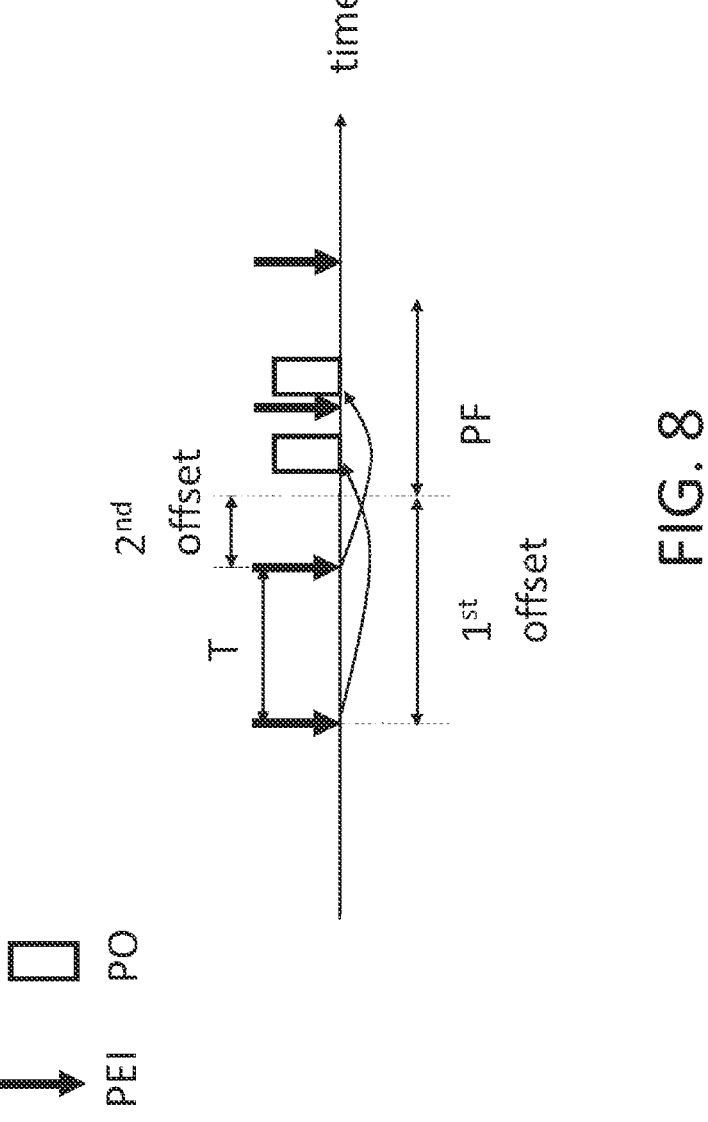
FIG. 8 shows a relationship between PEIs and POs according to another embodiment of the present disclosure.

Case 1.2:

If the second bit field in the first PEI indicates that the third bit field is the per-sub-group paging indication, the UE corresponding to the first PO performs the operation according to the paging indication in the third bit field of the first PEI (see FIG. 8). In some embodiments, the UE corresponding to the $n^{th}$ PO detects the $n^{th}$ PEI, and performs operations in accordance with the paging indication of the third bit field of the $n^{th}$ PEI. The offset between the $n^{th}$ PEI and the reference location can be calculated by the equation that $n^{th}$ offset=1st offset−n×T. In this equation, $n^{th}$ offset is the distance between the $n^{th}$ PEI and the reference location, Pt offset is the distance between the first PEI and the reference location, and T is the period of the PEIs. In some embodiments, the UE corresponding to the $n^{th}$ PO may detect the $(n+1)^{th}$ PEI in the PEI window.

In some embodiments, the UE of a sub-group m performs the operation according to the $m^{th}$ bit in the third bit field of the corresponding PEI, in which the operation includes detecting the paging PDCCH, or not detecting the paging PDCCH.

In some embodiments, when the third bit field is the per-sub-group paging indication, each PEI carries paging indication corresponding to one PO.

In some embodiments, the bit fields in the first PEI and other PEIs are the same. In some embodiments, the bit fields in the first PEI and other PEIs are different. For example, when the second bit field in the first PEI indicates that the third bit field is the per-sub-group paging indication, except for the first PEI, the other PEIs may not include the second bit field. For another example, except for the first PEI, the other PEIs may only contain the third bit field.

Although the $2^{nd}$ PEI is taking as an example of the $n^{th}$ PEI in FIG. 8, the present disclosure is not limited by this. Case 2:

In some embodiments, the UE may detect the PEIs at PEI locations. The location of the PEI that the UE detects is related to the mapping relationships between PEI and PO, one or more higher layer parameters, or other configurations. When the mapping relationship between the PEI and the PO is 1-to-1, the UE corresponding to the $n^{th}$ PO receives the $n^{th}$ PEI in the PEI window. When the mapping relationship between the PEI and the PO is 1-to-K, in which K is a positive integer larger than one, the UE receives the first PEI. In the above description, the mapping relationship between the PEI and the PO is 1-to-1 means that each PO corresponds to an independent PEI. The mapping relationship between the PEI and the PO is 1-to-K means that one PEI can indicate operations of the UEs corresponding to multiple POs (e.g., K POs).

In some embodiments, the 1st offset, which is the distance between the start point of the first PEI and the reference location, may be determined by a network device or be pre-determined. In some embodiments, the reference location is the start point of a corresponding PF. In some embodiments, different reference locations corresponding to different PFs may have different offsets. In some embodiments, the reference location is a radio frame (RF) having an SFN mod M=0, M is a positive integer. In some embodiments, the reference location is an SFN mod M=0, M is a positive integer. In some embodiments, the reference location is the time domain position of the SSB (e.g., presented as a slot number). In some embodiments, the value of M is related to the DRX cycle T_DRX and the number of total paging frames in the DRX cycle N_PF. For example, M=xx T_DRX/N_PF, where x is a positive integer. In a case where x=1, the number of reference locations is equal to the number of PFs in the DRX cycle. That is, each PF corresponds to one reference location. In another case where x>1, e.g., x=2, every two PFs corresponds to one reference location.

If the mapping relationship between the PEI and the PO is 1-to-K as described above, the UE detects the first PEI. The third bit field in the first PEI is the per-PO paging indication. In some embodiments, the UE corresponding to the $n^{th}$ PO associated with the first PEI determines whether to receive the paging PDCCH according to the $n^{th}$ bit in the third bit field in the first PEI.

In some embodiments, the $n^{th}$ offset, which is the distance between the start point of the $n^{th}$ PEI and the reference location, can be calculated by the equation that $n^{th}$ offset=1st offset$-n\times$T. In this equation, $n^{th}$ offset is the distance between the $n^{th}$ PEI and the reference location, Pt offset is the distance between the first PEI and the reference location, and T is the period of the PEIs.

If the mapping relationship between the PEI and the PO is 1-to-1 as described above, the UE detects the $n^{th}$ PEI. The third bit field in the $n^{th}$ PEI is the per-sub-group paging indication. In some embodiments, the UE of sub-group m performs the operation according to the $m^{th}$ bit in the third bit field of the $n^{th}$ PEI, in which the operation includes detecting the paging PDCCH, or not detecting the paging PDCCH.

Through the configuration above, the position of the $n^{th}$ PEI can be determined by the period of the PEIs and the offset between the first PEI and reference location. In this way, there is no need to configure the distances between each PO and PEI, such that the number of required parameters and system complexity can be reduced. The paging indication (i.e., the third bit field) of the PEIs can express different meanings in different scenarios, so as to ensure the flexibility of the paging indication and meet the requirements of different scenarios. No matter the mapping relationship between the PEI and the PO is 1-to-1 or 1-to-K, the configuration described above can be used to determine the positions of the PEIs accurately.

Figure 9:
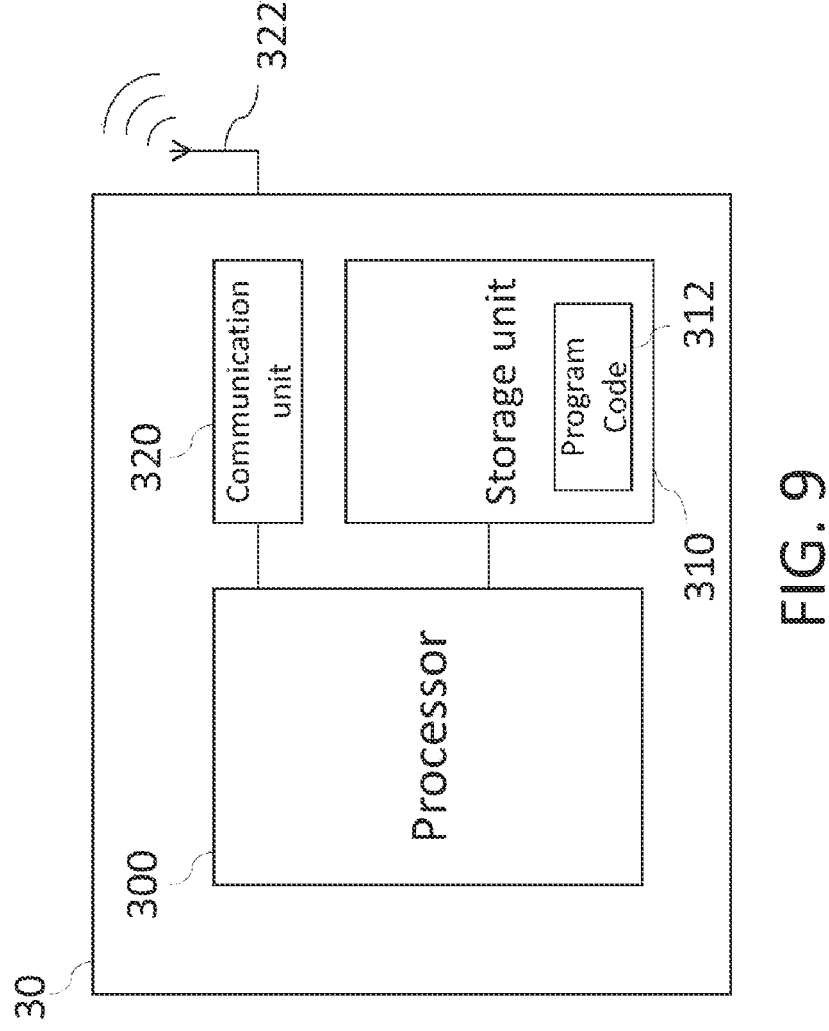
FIG. 9 shows an example of a schematic diagram of a wireless communication terminal according to an embodiment of the present disclosure.

FIG. 9 relates to a schematic diagram of a wireless communication terminal 30 (e.g., a terminal node or a terminal device) according to an embodiment of the present disclosure. The wireless communication terminal 30 may be a user equipment (UE), a mobile phone, a laptop, a tablet computer, an electronic book or a portable computer system and is not limited herein. The wireless communication terminal 30 may include a processor 300 such as a microprocessor or Application Specific Integrated Circuit (ASIC), a storage unit 310 and a communication unit 320. The storage unit 310 may be any data storage device that stores a program code 312, which is accessed and executed by the processor 300. Embodiments of the storage code 312 include but are not limited to a subscriber identity module (SIM), read-only memory (ROM), flash memory, random-access memory (RAM), hard-disk, and optical data storage device. The communication unit 320 may a transceiver and is used to transmit and receive signals (e.g., messages or packets) according to processing results of the processor 300. In an embodiment, the communication unit 320 transmits and receives the signals via at least one antenna 322.

In an embodiment, the storage unit 310 and the program code 312 may be omitted and the processor 300 may include a storage unit with stored program code.

The processor 300 may implement any one of the steps in exemplified embodiments on the wireless communication terminal 30, e.g., by executing the program code 312.

The communication unit 320 may be a transceiver. The communication unit 320 may as an alternative or in addition be combining a transmitting unit and a receiving unit configured to transmit and to receive, respectively, signals to and from a wireless communication node.

In some embodiments, the wireless communication terminal 30 may be used to perform the operations of the UE described above. In some embodiments, the processor 300 and the communication unit 320 collaboratively perform the operations described above. For example, the processor 300 performs operations and transmit or receive signals, message, and/or information through the communication unit 320.

Figure 10:
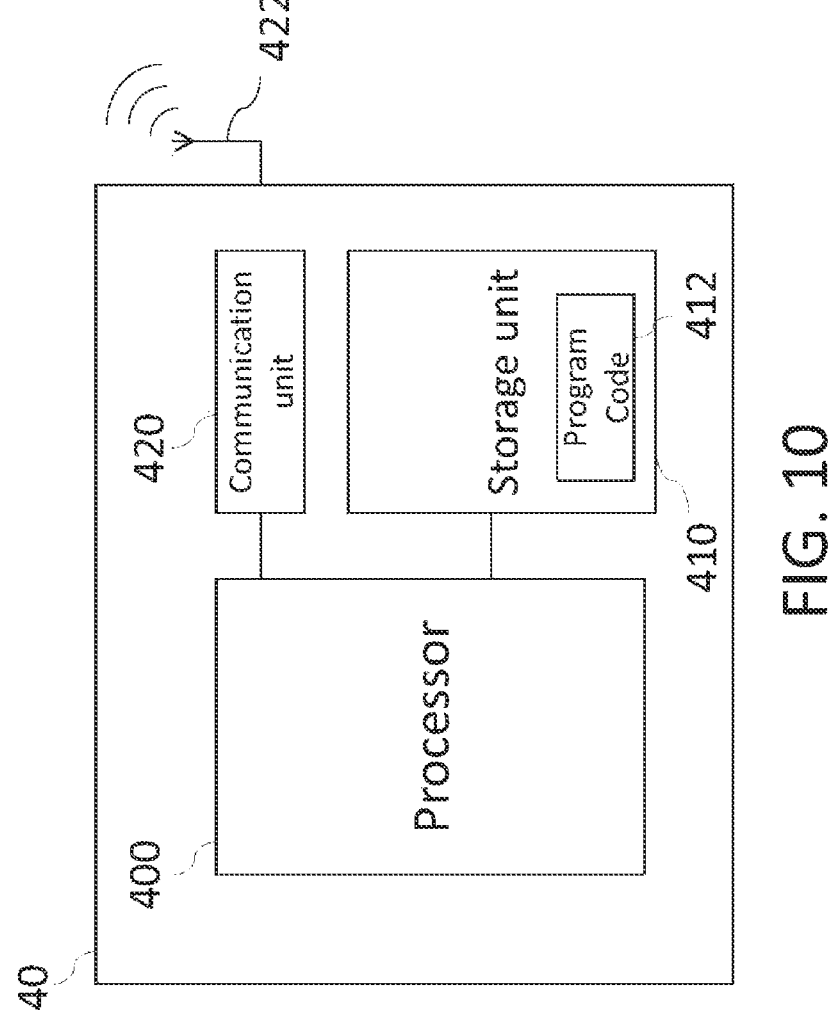
FIG. 10 shows an example of a schematic diagram of a wireless communication node according to an embodiment of the present disclosure.

FIG. 10 relates to a schematic diagram of a wireless communication node 40 (e.g., a network device) according to an embodiment of the present disclosure. The wireless communication node 40 may be a satellite, a base station (BS) (e.g., a gNB or a gNB-CU-CP), a network entity, a Mobility Management Entity (MME), Serving Gateway (S-GW), Packet Data Network (PDN) Gateway (P-GW), a radio access network (RAN), a next generation RAN (NG-RAN), a data network, a core network or a Radio Network Controller (RNC), and is not limited herein. In addition, the wireless communication node 40 may include (perform) at least one network function such as an access and mobility management function (AMF), a session management function (SMF), a user place function (UPF), a policy control function (PCF), an application function (AF), an Unified Data Management (UDM), a network slice Selection Function (NSSF) etc. The wireless communication node 40 may include a processor 400 such as a microprocessor or ASIC, a storage unit 410 and a communication unit 420. The storage unit 410 may be any data storage device that stores a program code 412, which is accessed and executed by the processor 400. Examples of the storage unit 412 include but are not limited to a SIM, ROM, flash memory, RAM, hard-disk, and optical data storage device. The communication unit 420 may be a transceiver and is used to transmit and receive signals (e.g., messages or packets) according to processing results of the processor 400. In an example, the communication unit 420 transmits and receives the signals via at least one antenna 422.

In an embodiment, the storage unit 410 and the program code 412 may be omitted. The processor 400 may include a storage unit with stored program code.

The processor 400 may implement any steps described in exemplified embodiments on the wireless communication node 40, e.g., via executing the program code 412.

The communication unit 420 may be a transceiver. The communication unit 420 may as an alternative or in addition be combining a transmitting unit and a receiving unit configured to transmit and to receive, respectively, signals, messages, or information to and from a wireless communication node and/or a wireless communication terminal.

In some embodiments, the wireless communication node 40 may be used to perform the operations of the gNB described above. In some embodiments, the processor 400 and the communication unit 420 collaboratively perform the operations described above. For example, the processor 400 performs operations and transmit or receive signals through the communication unit 420.

A wireless communication method is also provided according to an embodiment of the present disclosure. In an embodiment, the wireless communication method may be performed by using a wireless communication terminal (e.g., a UE). In an embodiment, the wireless communication terminal may be implemented by using the wireless communication terminal 30 described above, but is not limited thereto.

Figure 11:
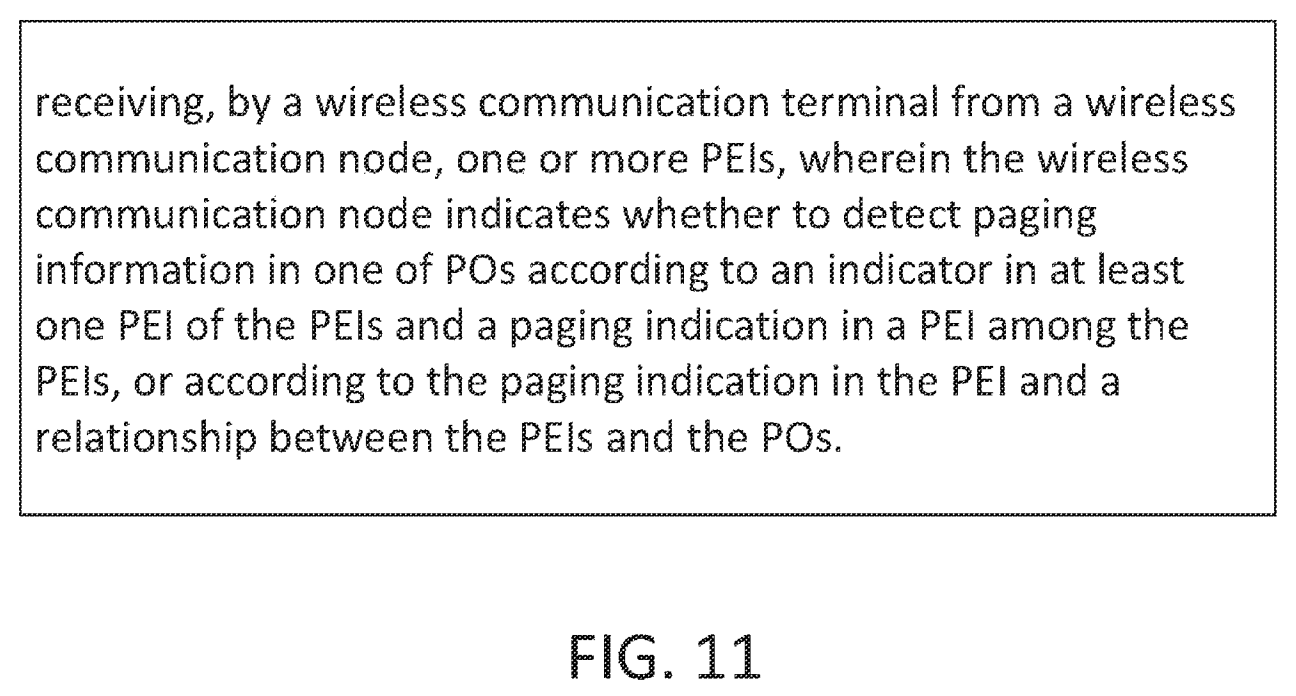

Referring to FIG. 11, in an embodiment, the wireless communication method includes: receiving, by a wireless communication terminal from a wireless communication node, one or more paging early indications, PEIs. The wireless communication node indicates whether to detect paging information in one of paging occasions, POs, according to an indicator in at least one PEI of the PEIs and a paging indication in a PEI among the PEIs, or according to the paging indication in the PEI and a relationship between the PEIs and the POs.

In an embodiment, the indicator includes the second bit field described above. In an embodiment, the indicator includes the per-PO and/or the per-sub-group paging indication described above. In an embodiment, the indicator paging indication includes the third bit field described above. The relationship between the PEIs and the POs includes the mapping relationship (i.e., 1-to-1 and/or 1-to-K) described above.

Details in this regard can be ascertained with reference to the paragraphs above, and will not be repeated herein.

A wireless communication method is also provided according to an embodiment of the present disclosure. In an embodiment, the wireless communication method may be performed by using a wireless communication node (e.g., a gNB). In an embodiment, the wireless communication node may be implemented by using the wireless communication node 40 described above, but is not limited thereto.

Referring to FIG. 12, in an embodiment, the wireless communication method includes: transmitting, by a wireless communication node to a wireless communication terminal, one or more paging early indications, PEIs, to indicate the wireless communication terminal to detect paging information in one of paging occasions, POs, or not according to an indicator in at least one PEI of the PEIs and a paging indication in a PEI among the PEIs, or according to the paging indication in a PEI and a relationship between the PEIs and the POs.

In an embodiment, the indicator includes the second bit field described above. In an embodiment, the indicator includes the per-PO and/or the per-sub-group paging indication described above. In an embodiment, the indicator paging indication includes the third bit field described above. The relationship between the PEIs and the POs includes the mapping relationship (i.e., 1-to-1 and/or 1-to-K) described above.

Details in this regard can be ascertained with reference to the paragraphs above, and will not be repeated herein.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any one of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any one of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any one of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc., can be configured to perform one or more of the functions described herein. The term "configured to" or "configured for" as used herein with respect to a specified operation or function refers to a processor, device, component, circuit, structure, machine, unit, etc., that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A wireless communication method comprising:
receiving, by a wireless communication terminal from a wireless communication node, one or more paging early indications (PEIs), wherein the wireless communication node indicates whether the wireless communication terminal is to detect paging information in one paging occasion of paging occasions (POs), according to an indicator in at least one PEI of the PEIs and a paging indication in a PEI among the PEIs; or
according to the paging indication in the PEI and one of one or more mapping relationships between the PEIs and the POs, and
wherein a first PEI of the PEIs has a 1st offset before a first PO of the POs or a reference location, a nth PEI of the PEIs has a nth offset before the first PO or an nth PO of the POs or the reference location, and the nth offset of the nth PEI is determined by (the 1st offset−n×T), wherein n is a positive integer and T indicates a period of the PEIs.

2. The wireless communication method of claim 1, wherein the wireless communication terminal detects the at least one PEI of the PEIs in a PEI window and a number of the PEIs in the PEI window is determined by at least one of:
a number of POs between two Synchronization Signal/PBCH Blocks (SSBs);

one or more higher layer parameters;

information transmitted by a System Information Block (SIB);

a number of POs in a paging frame (PF);

a number of POs between two PEI windows;

a number of POs corresponding to one PEI window;

a number of PFs corresponding to one PEI window;

a number of PFs between two PEI windows; or the number of the PEIs in the PEI window is 4, 8 or 12.

3. The wireless communication method of claim 2, wherein the wireless communication terminal corresponds to the $n^{th}$ PO of the POs detects a $p^{th}$ PEI in the PEI window; the value of p is determined by at least one of the mapping relationships between the PEIs and the POs, one or more higher layer parameters or one or more higher layer configurations; and p is a positive value.

4. The wireless communication method of claim 1, wherein the at least one PEI comprises at least one of:

a first bit field, indicating whether at least one of a Channel-State Information Reference Signal (CSI-RS) or a Tracking Reference Signal (TRS) is available to the wireless communication terminal in an IDLE or inactive mode;

a second bit field, indicating the meaning of a third bit field;

the third bit field, comprising one or more paging indications, indicating the wireless communication terminal to detect paging information in a corresponding PO or not; or a fourth bit field, providing an indication including a system information (SI), change information or an Earthquake and Tsunami Warning System (ETWS) information.

5. The wireless communication method of claim 4, wherein the third bit field comprises:

a bit in third bit field indicating one or more wireless communication terminals associated with a PO or a PO group whether to detect paging information; or a bit in third bit field indicating one or more wireless communication terminals associated with one sub-group of sub-groups of one PO whether to detect paging information.

6. The wireless communication method of claim 1, wherein the wireless communication terminal detects the at least one PEI, and the wireless communication terminal detects paging information in the $n^{th}$ PO of the POs or not according to an $n^{th}$ bit in a paging indication of the at least one PEI in response to each bit of the paging indication of the PEI corresponds to one of the POs.

7. The wireless communication method of claim 1, wherein the wireless communication terminal detects the at least one PEI and the $n^{th}$ PEI, and the wireless communication terminal detects paging information in an $m^{th}$ sub-group of the $n^{th}$ PO or not according to an $m^{th}$ bit in a paging indication of the $n^{th}$ PEI in response to each bit of the paging indication of the PEI corresponds to a sub-group.

8. The wireless communication method of claim 1, wherein the wireless communication terminal detects paging information in the $n^{th}$ PO of the POs or not according to an $n^{th}$ bit in a paging indication of the at least one PEI in response to the at least one PEIs corresponding to more than one of the POs.

9. The wireless communication method of claim 1, wherein the wireless communication terminal detects paging information in the $n^{th}$ PO of the POs or not according to a paging indication of the $n^{th}$ PEI in response to that each of the PEIs corresponds to one of the POs.

10. A wireless communication method comprising:

transmitting, by a wireless communication node to a wireless communication terminal, one or more paging early indications (PEIs) to indicate whether the wireless communication terminal is to detect paging information in one paging occasion of paging occasions (POs) or not according to an indicator in at least one PEI of the PEIs and a paging indication in a PEI among the PEIs, or according to the paging indication in a PEI and a relationship between the PEIs and the POs, and wherein a first PEI of the PEIs has a $1^{st}$ offset before a first PO of the POs or a reference location, a $n^{th}$ PEI of the PEIs has a $n^{th}$ offset before the first PO or an $n^{th}$ PO of the POs or the reference location, and the $n^{th}$ offset of the $n^{th}$ PEI is determined by (the $1^{st}$ offset$-n{\times}T$), wherein n is a positive integer and T indicates a period of the PEIs.

11. The wireless communication method of claim 10, wherein the wireless communication node transmits the at least one PEI in a PEI window to the wireless communication terminal to indicate the wireless communication terminal to, based on the indicator in the at least one PEI, detect paging information of the $n^{th}$ PO of the POs or not according to a paging indication of the at least one PEI in the PEI window or according to a paging indication of an $n^{th}$ PEI in the PEI window.

12. The wireless communication method of claim 11, wherein the wireless communication node transmits the at least one PEI to the wireless communication terminal to indicate the wireless communication terminal to detect paging information in the $n^{th}$ PO of the POs or not according to an $n^{th}$ bit in a paging indication of the at least one PEI in the PEI window in response to the indicator indicating that each bit of the paging indication of the PEI corresponds to one of the POs.

13. The wireless communication method of claim 10, wherein the wireless communication node transmits the at least one PEI to the wireless communication terminal to indicate the wireless communication terminal to, according to an $n^{th}$ bit in a paging indication of the at least one PEI, detect paging information in the $n^{th}$ PO of the POs or not in response to each bit of the paging indication of the at least one PEI corresponds to one of the POs.

14. The wireless communication method of claim 10, wherein the wireless communication node transmits the $n^{th}$ PEI to the wireless communication terminal to indicate the wireless communication terminal to, according to a paging indication of the $n^{th}$ PEI, detect paging information in the $n^{th}$ PO of the POs or not in response to each bit of the paging indication of the at least one PEI or the $n^{th}$ PEI corresponds to one sub-group of sub-groups.

15. The wireless communication method of claim 10, wherein the correspondence indicator in the at least one PEI indicates each bit of a paging indication of the at least one PEI corresponding to one of the POs or corresponding to one sub-group of sub-groups of wireless communication terminals corresponding to one of the POs.

16. The wireless communication method of claim 10, wherein in response to each bit of a paging indication of the at least one PEI corresponding to one of the POs, a number of bits in the paging indication is determined by a number of POs correspond to the at least one PEI, one or more higher layer parameters, a number of PFs related to the at least one PEI, or a number of POs in each PF.

17. The wireless communication method of claim 10, wherein in response to each bit of a paging indication of the at least one PEI corresponding to one sub-group of sub-groups of wireless communication terminals corresponding to one of the POs, a number of bits in the paging indication is determined by a number of the sub-groups corresponding to one of the POs, a maximum number of the sub-groups corresponding to one of the POs, or one or more higher layer parameters.

18. The wireless communication method of claim 10, wherein a number of bits in a paging indication is determined by at least one of:

a number of POs associated with one of the PEIs;

a maximum number of POs able to be associated with one of the PEIs;

a number of the sub-groups corresponding to one of the POs;

a maximum number of the sub-groups corresponding to one of the POs;

a larger value of the number of POs associated with one of the PEIs and the number of the sub-groups corresponding to one of the POs;

a larger value of a maximum number of POs able to be associated with one of the PEIs and the number of the sub-groups corresponding to one of the POs; or a larger value of a maximum number of POs able to be associated with one of the PEIs and the maximum number of the sub-groups corresponding to one of the POs.

19. A wireless communication terminal, comprising:

a communication unit; and a processor configured to receive, from a wireless communication node, one or more paging early indications (PEIs), wherein the wireless communication node indicates whether the wireless communication terminal is to detect paging information in one paging occasion of paging occasions (POs) according to an indicator in at least one PEI of the PEIs and a paging indication in a PEI among the PEIs; or according to the paging indication in the PEI and a relationship between the PEIs and the POs, and wherein a first PEI of the PEIs has a $1^{st}$ offset before a first PO of the POs or a reference location, a $n^{th}$ PEI of the PEIs has a $n^{th}$ offset before the first PO or an $n^{th}$ PO of the POs or the reference location, and the $n^{th}$ offset of the $n^{th}$ PEI is determined by (the $1^{st}$ offset$-n\times T$), wherein n is a positive integer and T indicates a period of the PEIs.

20. A wireless communication node, comprising:

a communication unit; and a processor configured to transmit, to a wireless communication terminal, one or more paging early indications (PEIs) to indicate whether the wireless communication terminal is to detect paging information in one paging occasion of paging occasions (POs) or not according to an indicator in at least one PEI of the PEIs and a paging indication in a PEI among the PEIs, or according to the paging indication in a PEI and a relationship between the PEIs and the POs, and wherein a first PEI of the PEIs has a $1^{st}$ offset before a first PO of the POs or a reference location, a $n^{th}$ PEI of the PEIs has a $n^{th}$ offset before the first PO or an $n^{th}$ PO of the POs or the reference location, and the $n^{th}$ offset of the $n^{th}$ PEI is determined by (the $1^{st}$ offset$-n\times T$), wherein n is a positive integer and T indicates a period of the PEIs.

* * * * *